United States Patent Office 3,449,430
Patented June 10, 1969

3,449,430
AMINO OXIDES
Roman Dohr, Dusseldorf, and Wilhelm Jakob Kaiser, Dusseldorf-Holthausen, Germany, assignors to Henkel & Cie. G.m.b.H., Dusseldorf-Holthausen, Germany, a corporation of Germany
No Drawing. Filed June 20, 1961, Ser. No. 118,258
Claims priority, application Germany, July 14, 1960, 39,944
Int. Cl. C07c *149/14, 93/02, 93/00*
U.S. Cl. 260—583                               10 Claims The present invention relates to compounds having high surface activity and to methods for producing the said compounds. More particularly, the invention relates to amino oxides having high surface activity being completely non-irritating to the skin.

It has now been found that products prepared by oxidizing an amine having the general formula

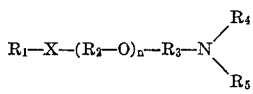

wherein $R_1$ is an aliphatic hydrocarbon radical having 8–22 and preferably 12–18 carbon atoms, X is an oxygen or sulfur atom, $R_2$ is an ethylene, propylene or hydroxy propylene radical, $n$ is an integer of from 0–18 and preferably from 0–10, $R_3$ is an organic radical possibly containing hydroxyl groups and having at least 3 and preferably 3–4 carbon atoms as, for example, an alkyl or alkanol radical, and $R_4$ and $R_5$ are lower hydrocarbon radicals having at the most 5 and preferably 3 carbon atoms, in the conventional manner for oxidizing amino atoms, are possessed of good washing, foaming and detergency properties and, above all, are non-irritating to the skin. It is specifically understood that in the general formula as used above and in the claims, the term $(R_2-O)_n$ does not necessarily designate the same $R_2O$ radical $n$ times, but may designate $n$ number of different or same $R_2O$ radicals. Thus, for example, if $n$ is 3, $R_2$ may be a methyl, ethyl, and propyl radical; that is, different radicals of $R_2$ may be bound in a polyether chain, such as mixed addition products of ethylene oxide and propylene oxide.

Amino oxides having surface activity are known in which the hydrophobic organic radical is linked with the radical carrying the amino oxide grouping via an oxygen or sulfur atom or via a carboxylic acid ester group. An example of such a compound in which an oxygen atom is the linking member is the dodecylether of p-dimethylaminophenol and an example of a compound in which a carboxylic acid ester group serves as the linking member is the dodecyl ester of N-dimethylaminoethyl alcohol. However, these compounds and others of their class are irritating to the skin, making them unsuitable for most practical applications. Furthermore, amino oxides derived from dodecyl esters of N-dimethylaminoethyl alcohol are easily split in alkaline solution and, therefore, are not suitable for use in washing agents having a basic reaction.

The present products are prepared by oxidizing amines prepared from suitable initial materials, such as fatty alcohols of suitable molecular size, mercaptans, partial ethers, partial thioethers of the aforesaid alcohols or mercaptans and polyglycols, prepared, for example, by addition of alkylene oxide, as, for example, ethylene oxide, propylene oxide or glycide to an alcohol or mercaptan. The hydrocarbon radicals of the fatty alcohols or mercaptans can be straight or branched chain, saturated or unsaturated, and have an even or odd number of carbon atoms.

The initial alcohol materials are reacted in the known manner with acrylic or methacrylic acid nitrile to obtain the ether of the initial alcohol material, and β-oxalkyl nitrile. The nitrile is thereafter reduced to the primary amine and converted in the conventional manner to the tertiary amine. The tertiary amine is then further oxidized by the conventional reaction reaction to the amino oxide.

Alternatively, the starting alcoholic component may be reacted with a halogenhydrine, as, for example, epichlorohydrine and the glycide ether obtained reacted with a low molecular weight secondary amine to yield a tertiary amine which is thereafter oxidized to produce the amino oxide. Instead of the sequence just noted, the amine and epichlorhydrine may be caused to react together and the epoxy amine added to the starting alcohol component to form the desired amino oxide.

The amino oxides are obtained in this manner in excellent yields and represent valuable products which may be used alone, in a mixture with one another and/or with other assistants, as washing, foaming, and dispersing agents. The products, as obtained, are completely odorless and may be employed directly without being first processed for purification.

The amino oxides in accordance with the invention are nonionic surface-active materials and may be advantageously employed together with all of the other known surface-active materials of anionic, cationic or nonionic nature. They do not under any circumstances form precipitates on combination with anionic or cationic surface-active materials. This property renders them particularly valuable in the preparation of paste for use as hair coloring rinses. The hair coloring rinses contain dyestuffs which are soaked up—i.e., penetrating the hair and, in particular, dyestuffs containing quaternary ammonium groups. If the hair coloring rinse containing such a dyestuff is employed together with an anionic surface-active material, the quaternary dyestuff is separated out as a water-insoluble salt of the surface-active substance, thereby preventing any penetration of the hair by the coloring material. If cationic surface-active materials are employed in place of the anionic materials in the preparation of the hair coloring rinse, then the cationic surface-active material penetrates the hair and lessens considerably, if not entirely, the similar penetration of the hair by the cationic dyestuff, whereby no coloring or incomplete coloring is effected. In complete contrast, the nonionic surface-active agents prepared in accordance with the invention are advantageously employed together with the dyestuffs, neither giving rise to precipitation nor are they possessed of more favorable penetration properties.

The products in accordance with the invention are particularly suitable for washing hair and may be produced as solid, liquid or paste-like products. Although the amino oxides of the invention or aqueous solutions thereof may be used per se without any further processing or additions, it is advantageous to employ them together with other substances customarily used in producing hair coloring agents. Thus, for example, it is advantageous to combine them with super-fatting agents, solvents, perfumes, dyestuffs, etc. The combination of the amino oxide and other materials may be effected in the conventional manner and in any desired sequence.

If the amino oxides are to be combined with super-fatting agents, as, for example, free fatty acids, fatty alcohols, fatty acid esters, lanolin, etc., then it is advantageous that the super-fatting agents first be melted and thereafter admixed with the amino oxides or with their aqueous or alcoholic solutions. Satisfactory alcohols for this purpose include ethanol, propanol, and isopropanol.

Although the amino oxides in accordance with the invention constitute excellent emulsifying agents and are suitable for furnishing stable emulsions, it may be advantageous to include in the emulsion so formed the conventional emulsion stabilizers. Satisfactory stabilizers include polymerized carboxylic acids or water-soluble derivatives thereof, as, for example, polyacrylic acid, polymethacrylic acid salts, polyacrylamide, polymethacrylamide, etc. In addition, the water-soluble derivatives of macro-molecular carbohydrates, as, for example, alginates, cellulose, starch glycolates, methyl cellulose or oxyalkyl cellulose, cellulose sulfates, etc., may be used for this purpose.

Hair washing agents prepared with amino oxides in accordance with the invention contain, in general, about 5–20 weight percent and preferably 8–10 weight percent of an amino oxide calculated as active substance. The hair washing compositions may contain the other additions in amounts varying over wide ranges. Generally, the hair washing agents will fall within the following compositions:

5–20 weight percent and preferably 8–10 weight percent amino oxide
5–20 weight percent and preferably 10–15 weight percent super-fatting
0.1–2 weight percent and preferably 1–2 weight percent dyestuff
1–10 weight percent and preferably 5–10 weight percent solvent
1–5 weight percent and preferably 2–3 weight percent emulsion stabilizer, the remainder being composed of other customary hair rinse components, such as, for example, perfume.

The amino oxides in accordance with the invention represent good emulsifying agents and use thereof for this purpose is not limited to their inclusion in hair washing preparations but generally wherever the production of emulsions is desired and, in particular, in connection with washing and cleaning agents. Advantageously, the amino oxides of the invention may be used to increase the cleaning and washing capacity of agents employed in connection with fatty and greasy objects, such as, for example, for cleaning household utensils and for washing textile products.

The aqueous solutions of the amino oxides possess excellent foaming capacity and such solutions are quite resistant to grease and other fatty accumulations.

As the amino oxide products as obtained in accordance with the invention are not split in alkaline solutions, they may be advantageously employed not only in the preparation of neutral to weakly-alkaline-mild washing agents, but also in the preparation of strongly-alkaline washing agents, i.e., the so-called "boiling washing agents" suitable for washing dirty cottons, etc. The textile washing agents prepared with the amino oxides of the invention may be in the form of pastes, creams, liquids or solvents. The products are prepared by combination with the known additive, including those of neutral to markedly alkaline action. The pH value of a 1% solution of a washing agent so prepared should advantageously fall within the range of 6–11. The mild washing agents should advantageously be regulated so as to produce a pH of about 7–8, while the strong—i.e., boiling—washing agents should advantageously have a pH in the range of about 9–10.5. Suitable inorganic salts for inclusion in such washing agents include, for example, soda, water-soluble alkali silicates, mono-, di-, and/or tri-alkaliorthophosphates, sodium sulfate, pyro-, poly- or meta phosphates, etc. In addition, there may also be included in the washing agents such products as per-compounds and, in particular, perborates, stabilizers for the latter as, for example, magnesium silicate and water-soluble high molecular organic substances which serve to increase the dirt removal capacities of the washing agent. Included in such materials are the emulsion stabilizers heretofore set out.

The washing agents advantageously contain from 5–75 and preferably from 10–35 weight percent of the amino oxides.

The strongly alkaline washing agents—i.e., boiling washing agents—most advantageously contain from 5–7 and preferably from 10–50 weight percent of the amino oxide.

The anhydrous phosphates are preferably utilized in an amount of from 0–75 weight percent and most preferably from 5–50 weight percent.

The per-compounds are added in an amount regulated so that the content of active oxygen of the resulting composition amounts to 0–3.5 weight percent and preferably from 0.2–3 weight percent. The stabilizers for the per-compounds are advantageously employed in an amount of from 0–15, and preferably from 2–10 weight percent.

The other components of the washing agent, among them the substances serving to increase the dirt-removal properties of the surface-active agent, may be present in amounts of from 0–2 weight percent and preferably from 0.2–1.5 weight percent.

The washing agents containing the amino oxide may be prepared by any of the conventional processes as, for example, by admixing of the individual components, by mixture of the components suspended or dissolved in water, which liquid mixture is thereafter dried either partially or entirely to form a paste or dry powder or, alternatively, through binding of the water present in a paste-like product by addition thereto of inorganic salts to form a substantially dry product.

The following examples illustrate the invention without limiting it thereto:

EXAMPLE 1

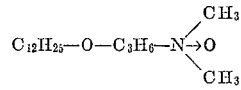

1.5 mols of acrylonitrile are dropped into 1 mol lauryl alcohol after addition to the latter of 0.02 weight percent metallic sodium at a temperature of 40–50° C. while constantly stirring. The reaction heat liberated thereby is drawn off by cooling. After addition of the entire amount of acrylonitrile, the stirring is continued for 2 further hours at 80° C. and thereafter the excess acrylonitrile is driven off. The resulting residue is transferred to a hydrogenating autoclave and therein treated with 10 weight percent of Raney cobalt. After the autoclave has been shut, the reaction chamber is rinsed with gaseous ammonia and 8 atmospheres of ammonia are admitted. The contents of the autoclave are thereupon reduced at a hydrogen pressure of 150 atmospheres for 4 hours at 130–150° C. When the hydrogenation is complete, the autoclave is opened, the catalyst filtered off, and the crude lauryl aminopropylether distilled in vacuum. The main fraction distills over at 131° C. 1 mm. Hg.

200 g. of the lauryl-aminopropylether thus obtained are dissolved in 200 cc. ethyl alcohol and treated under ice-cooling with 212 g. of 85% formic acid. The clear solution obtained is heated to 50° C. and over a period of 1 hour 173 g. of 37% formaldehyde are added dropwise. The solution is boiled for 4 hours under reflux and after cooling made alkaline with about 24% NaOH. The oil layer is separated, dried with anhydrous sodium sulfate, filtered and distilled. The tertiary amine is distilled over at 138–142° C. at a vacuum of 1.5 mm. Hg.

100 g. of the tertiary amine are dissolved in 550 cc. alcohol and heated following the addition to the solution of 230 cc. of 6% hydrogen peroxide for 3 hours to 60° C. The completeness of the oxidation is established by treating a sample of the alcoholate solution with water, which, if the oxidation is complete, no longer produces any turbidity. Alcohol is evaporated and the excess hydrogen peroxide decomposed by contact with a platinum plate. After the water is distilled off under vacuum, there is obtained the crude hygroscopic amino oxide. Following recrystallization of the raw product from acetic ester, there are obtained colorless and odorless needles readily soluble in water having a melting point of 62–64° C. The resulting amino oxide is suitable for the production of a washing agent having the following composition:

Amino oxide _____ g__ 62
Fat-alcohol mixture $C_{16}$–$C_{18}$ _____ g__ 47.2
Fat-alcohol mixture $C_{12}$–$C_{18}$ _____ g__ 5.9
Water _____ cc__ 419

The fatty constituents are melted together and the amino oxide added thereto at 80° C. while stirring mildly. The stirring is continued and the mixture cooled to 40° C., the water being added in small portions.

The resulting product is a stable paste-form to liquid emulsion which is substantially insensitive to electrolyte conditions.

EXAMPLE 2

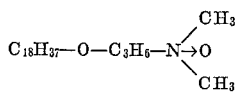

In the same way as described in Example 1, technical stearyl alcohol is processed. The resulting product is an amino oxide having a melting point after recrystallization of 65–67° C.

EXAMPLE 3

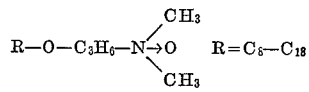

A technical fat-alcohol mixture obtainable by reduction of coconut oil fatty acids is processed as described in Example 1. The dimethylamine to be oxidized distills over at 1 mm. Hg at a temperature of 110–122° C. There is obtained, following oxidation and further working up, a paste-to-wax-like product, which has no fixed melting point.

A coarse washing agent of the following composition is prepared as follows:

|  | Wt. percent |
|---|---|
| Amino oxide | 20 |
| Sodium pyrophosphate | 39 |
| Disodiumorthophosphate | 5 |
| Water glass | 5 |
| Cellulose glycolate | 1 |
| Sodium sulfate and water | 30 |

The individual constituents are dissolved in the water and the solution reduced to a dry product by hot atomization of the same. As amino oxide, there is used a mixture consisting of equal quantities of the amino oxides produced according to Examples 2 and 3. If desired, there may be added to the finished powder sodiumperborate and stabilizers in the quantities conventionally employed.

EXAMPLE 4

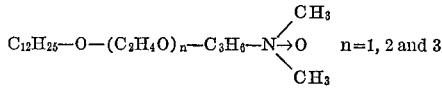

An additional product of 1.5 mols ethylene oxide and lauryl alcohol is separated by fractional distillation into the following fractions:

| | Boiling point, C./1 mm. Hg |
|---|---|
| Lauryl-alcohol-monoethyleneglycolether | 124–126 |
| Lauryl-alcohol-diethyleneglycolether | 154–156 |
| Lauryl-alcohol-triethyleneglycolether | 181–183 |

The aforesaid three fractions are further processed as described in Example 1. However, the products obtained from the triethyleneglycolether fraction are thereafter not further distilled. The reaction products with acrylonitrile have the following boiling points:

| | Boiling point |
|---|---|
| Nitriloether derived from lauryl - alcohol - monoethyleneglycolether | 158–160° C./0.3 mm. Hg. |
| Nitriloether derived from lauryl - alcohol - diethyleneglycolether | 177–179° C./0.2 mm. Hg. |

The amines obtained subsequent to reduction have the following boiling points:

| | Boiling point |
|---|---|
| Amine derived from lauryl-alcohol - monoethyleneglycolether | 152–160° C./1.5 mm. Hg. |
| Amine derived from lauryl-alcohol - diethyleneglycolether | 180–186° C./2.0 mm. Hg. |

The dimethylamines prepared from the primary amines have the following boiling points:

| | Boiling point |
|---|---|
| Dimethylamine prepared from lauryl-alcohol-monoethyleneglycolether | 172–180° C./2.5 mm. Hg. |
| Dimethylamine prepared from lauryl - alcohol - diethyleneglycolether | 185–190° C./1.0 mm. Hg. |

After oxidation and removal of the solvent, there are obtained colorless crystalline masses of indefinite melting point but falling within the range of about 40–60° C., which are easily soluble in water and possess an excellent foaming capacity. The products are especially suitable for the preparation of paste form or liquid washing preparations.

EXAMPLE 5

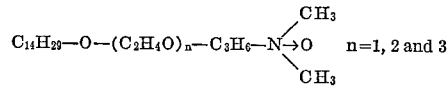

An addition product of 1.5 mols ethylene oxide and myristyl alcohol is fractionally distilled to produce the following fractions:

| | Boiling point |
|---|---|
| Myristyl - alcohol - monoethyleneglycolether | 146–148° C./2.0 mm. Hg. |
| Myristyl - alcohol - diethyleneglycolether | 188–190° C./1.0 mm. Hg. |
| Myristyl - alcohol - triethyleneglycolether | 210–212° C./1.0 mm. Hg. |

These fractions are processed as described in the previous example to the corresponding amino oxides. However, the intermediate products formed are not subjected to distillation. As in the previous example, there are in the instant case obtained, following oxidation, colorless crystalline masses having indefinite melting point but falling within the range of about 40–60° C.

A good washing agent is obtained if 100 g. of an amino oxide produced according to the above and 30 g. sodium sulfate are dissolved in water. The clear solution is treated by hot atomization to produce a fine powdery, good washing and foaming agent.

EXAMPLE 6

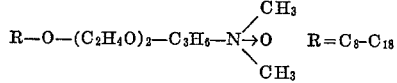

To a fatty alcohol mixture obtained by reduction of $C_8$–$C_{18}$ coconut oil fatty acids, there are added 2 mols ethylene oxide. The polyglycolether thereby produced is worked up substantially as described in the previous example to obtain the amino oxide. The aqueous solution resulting after oxidation and decomposition of the hydrogen peroxide is concentrated to a 33 weight percent amino oxide content. A washing paste possessing good washing and foaming capacity and having the following composition:

| | Wt. percent |
|---|---|
| Fat-alcohol $C_{16}$–$C_{18}$ | 16 |
| Amino oxide | 20 |
| Celluloseglycolate | 4 |
| Water | 60 | is obtained by dissolving 4 parts by weight celluloseglycolate under heating in 80 parts by weight of a 33% aqueous solution of the amino oxide and stirring this solution into the melted fat alcohol. The resulting product is a soft, pliable, white paste which may be employed for washing hair and for washing textiles and which has an excellent washing and foaming capacity.

EXAMPLE 7

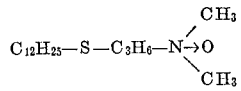

To an alcoholic solution of 1 mol lauryl-mercaptan and 0.01 mol metallic sodium there is gradually added (dropwise) at 50° C. under cooling 2 mols of acrylonitrile. After addition of the entire amount of the nitrile, stirring of the reaction mixture is continued for an additional 18 hours at 40° C. Thereafter, the excess nitrile is driven off and the residue distilled in vacuum. The nitrilothioether distills over at 132–135° C./0.4 mm. Hg.

This ether is dissolved in butanol and reduced at its boiling temperature by gradually introducing excess metallic sodium. After all of the sodium has been dissolved, the reaction mixture is cooled off and diluted with water. Thereupon a mixture of butanol, water, and amine is distilled over. After distilling for some time, some water is added and the distillation continued.

The distillate is made weakly acid with concentrated hydrochloric acid and thereafter concentrated. The concentrated distillate is treated with soda until slightly alkaline, dried and hydrogenated. The amine is purified by vacuum distillation, distilling over at 120° C./0.8 mm. Hg. The primary amine thereby obtained is further precipitated as described in Example 1 to form the tertiary amine, which is thereupon oxidized. The amino oxide is obtained in the form of a paste.

The resulting amino oxide is especially suitable for the production of a hair washing agent, as, for example, of the following composition:

| | Wt. percent |
|---|---|
| Fat-alcohol mixture $C_{16}$–$C_{18}$ | 18 |
| Fat-alcohol mixture derived from coconut oil acids $C_8$–$C_{18}$ | 2 |
| Lauryl-dimethylaminopropylthioether-N-oxide | 20 |
| Water | 60 |

The fat-alcohols are melted together and to the latter there are added, while stirring, the amino oxide dissolved in a small amount of water. Thereafter the remaining water is added slowly to obtain a white, water-soluble cream, imparting to the hair pliability, softness, and high lustre.

EXAMPLE 8

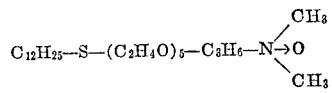

An addition product of 5 mols ethylene oxide and lauryl-mercaptan is converted into the corresponding amino oxide substantially as described in Example 1. The amino oxide obtained is in the form of a paste and is accordingly not isolated as such but, rather, the aqueous solution remaining after destruction of the hydrogen peroxide is concentrated to produce a solution containing 33 weight percent amino oxide.

EXAMPLE 9

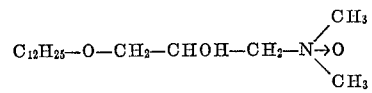

To 0.5 mol lauryl alcohol and 0.8 weight percent $SnCl_2$ which have been heated to 60–70° C., there are added (dropwise) over a 1 hr. period 0.5 mol epichlorohydrine. Stirring is continued for an additional 5 hours at the aforesaid temperature and the reaction mixture dissolved in benzene. The benzene solution is washed with dilute hydrochloric acid and thereafter dried with $Na_2SO_4$. The benzene is driven off by distillation and the residue distilled under vacuum, the glycerinmonochlorohydrine ether distilling over at 132–138° C./0.1 mm. Hg. The distillate thereby obtained is added in increments at 80° C. to 25% sodium hydroxide. The resulting mixture is stirred for an hour and the oil layer thereafter separated. The separated layer is washed with water until neutral, dried with $Na_2SO_4$ and distilled; the lauryl-glycide-ether distilling over at 178–181° C./2.5 mm. Hg.

A few drops of water are added to the lauryl-glycide-ether and there is thereupon added at 28–30° C. somewhat more than an equimolecular quantity of diethylamine dropwise. After completion of the diethylamine addition, stirring of the mixture is continued for 4 hours and thereafter a small amount of dilute sodium hydroxide is added. The oily layer is separated, dried, and distilled; the amine distilling over at 182–183° C./2.5 mm. Hg. The amine is oxidized in an alcoholic solution with 6% hydrogen peroxide substantially as described in Example 1. After standing for 3 hours, the alcohol and water are distilled off. The residue solidifies forming a solid, white, crystalline mass easily soluble in water and possessing a good foaming capacity. The product thus obtained may be directly used as a washing agent. After recrystallization, the melting point lies between 58–62° C.

If the chlorohydrine ether is directly condensed with the diethylamine after oxidation, the amino oxide just described is also obtained. When lauryl-alcohol is reacted with diethylaminoepoxypropane (produced according to Gilman et al., Journal of the American Chemical Society, vol. 68 (1946), pp. 1291–1293) following addition of catalytic quantities of $SnCl_4$, the product obtained on distillation (boiling point 164–167° C./3 mm. Hg) and oxidation is an amino oxide in solid crystalline form.

The resulting amino oxide is especially suitable for the production of a paste-form washing agent. To obtain such a product, 90 parts by weight of the amino oxide are melted together with 3 parts by weight of coconut oil acid diethanolamide and 2 parts by weight of a mixture of fat alcohols having 12–18 carbon atoms. Isopropanol may be added to the melt, if desired, in an amount varying over large range. For instance, 2–5 parts by weight of isopropanol may be added to produce a washing agent in the form of its 50% solution. A washing agent thus produced possesses even with greasy materials a good washing and foaming capacity.

EXAMPLE 10

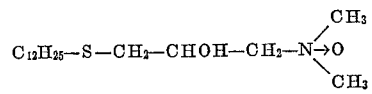

Lauryl mercaptan is converted as described in Example 9 into the corresponding amino oxide. After distillation of the solvent, the amino oxide is recovered in the form of a paste.

EXAMPLE 11

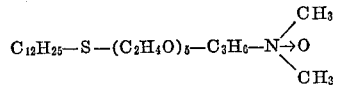

The addition product of 5 mols ethylene oxide and lauryl mercaptan is converted substantially as described in Example 9 into the corresponding amino oxide. After distilling off the solvent, the amino oxide in this instance is obtained in the form of a paste.

Skin tolerance tests

In order to determine the skin tolerance of preparations in accordance with the invention, the hands of 10 subjects having skin of varying conditions are immersed for 15 minutes into a 40° C. solution of the amino oxide being evaluated on from 4 to 6 consecutive days. The test solution is prepared from water of 16° dH (decrease hardness) and contains in solution 3 g. per liter of the product being tested. The condition of the skin of each subject is microscopically examined before and after each immersion and evaluated as follows:

(1)—Very good
(2)—Good
(3)—Satisfactory
(4)—Slightly roughened
(5)—Roughened
(6)—Markedly roughened The values determined are averaged and the mean thereof indicated in the following table:

Solutions of amino oxides of the following tertiary amines were evaluated for skin tolerance.

(1) Lauric acid ester of N-dimethylaminoethylalcohol
(2) Dodecylether of p-dimethylaminophenol
(3) Laurylether of N-dimethylaminopropylalcohol
(4) Laurylether of N-dimethyl-3-amino-1,2-dioxypropane
(5) Laurylether of N-dimethylaminopropylmercaptan

| Days of treatment | Skin tolerance | | | | |
|---|---|---|---|---|---|
| | 1 | 2 | 3 | 4 | 5 |
| 0 | 3.05 | 3.05 | 3.05 | 3.05 | 3.05 |
| 1 | 3.5 | 6.0 | 3.05 | 3.05 | 3.05 |
| 2 | 3.8 | | 3.1 | 3.05 | 3.2 |
| 3 | 4.2 | | 3.1 | 3.1 | 3.3 |
| 4 | 4.5 | | 3.15 | 3.1 | 3.3 |
| 5 | | | 3.1 | 3.1 | 3.1 |

| Days of treatment | Change of skin condition under treatment | | | | |
|---|---|---|---|---|---|
| | 1 | 2 | 3 | 4 | 5 |
| 1 | +0.5 | +2.95 | 0.0 | 0.0 | 0.0 |
| 2 | +0.8 | | +0.05 | 0.0 | +0.15 |
| 3 | +1.2 | | +0.05 | 0.0 | +0.25 |
| 4 | +1.5 | | +0.1 | +0.05 | +0.25 |
| 5 | | | +0.05 | +0.05 | +0.05 |

In the case of compound 2, the tests were discontinued after the first day since in almost every instance the subjects complained of marked burning of the skin.

We claim:
1. A compound of the structural formula

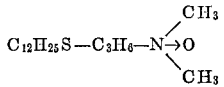

2. A compound of the structural formula

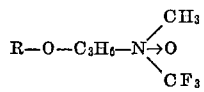

wherein R is an aliphatic hydrocarbon radical of 8–18 carbon atoms.

3. A compound of the structural formula

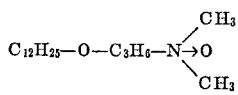

4. A compound of the structural formula

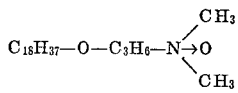

5. A compound of the structural formula

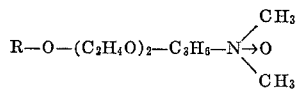

wherein R is an aliphatic hydrocarbon radical of 6–18 carbon atoms.

6. A compound of the structural formula

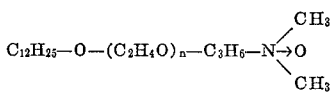

wherein $n$ is an integer of from 1–3.

7. A compound of the structural formula

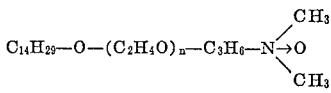

wherein $n$ is an integer of from 1–3.

8. A compound of the structural formula

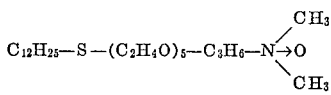

9. A compound of the structural formula

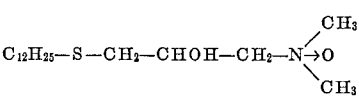

10. A compound of the structural formula

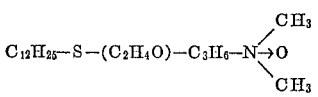

References Cited

UNITED STATES PATENTS

| 2,169,976 | 8/1939 | Guenther et al. | 260—404.5 |
| 3,047,579 | 7/1962 | Witman | 260—583 |
| 2,060,568 | 11/1936 | Graenacher et al. | 260—583 |
| 2,856,429 | 10/1958 | Sauer | 260—583 |
| 2,999,068 | 9/1961 | Pilcher et al. | 252—137 |
| 3,023,168 | 2/1962 | Doan | 252—137 |
| 2,769,824 | 11/1956 | Schneider | 260—583 |

CHARLES B. PARKER, *Primary Examiner.*
ANTON H. SUTTO, *Assistant Examiner.*

U.S. Cl. X.R.

8—10.1; 252—137, 152; 260—584; 424—70